United States Patent
Schroeder et al.

(10) Patent No.: US 7,091,679 B2
(45) Date of Patent: Aug. 15, 2006

(54) MAGNETIC THRUST MOTOR

(75) Inventors: Robert Schroeder, Machesney Park, IL (US); Robert Gronewold, Byron, IL (US); Cleve Koehler, Roscoe, IL (US); Richard Stevens, Rockford, IL (US); Glen Michalske, Stony Brook, NY (US)

(73) Assignee: Pacific Bearing Company, Rockford, IL (US)

( * ) Notice: Subject to any disclaimer, the term of this patent is extended or adjusted under 35 U.S.C. 154(b) by 77 days.

(21) Appl. No.: 10/782,710

(22) Filed: Feb. 19, 2004

(65) Prior Publication Data

US 2005/0184597 A1    Aug. 25, 2005

(51) Int. Cl.
   *H02K 41/00*    (2006.01)
(52) U.S. Cl. ......................................... 318/135; 310/12
(58) Field of Classification Search .................. 310/12; 318/135
   See application file for complete search history.

(56) References Cited

U.S. PATENT DOCUMENTS

| | | | | |
|---|---|---|---|---|
| 3,811,154 | A | * | 5/1974 | Lindeman et al. ............ 24/326 |
| 4,460,855 | A | | 7/1984 | Kelly ........................ 318/135 |
| 4,590,411 | A | | 5/1986 | Kelly ........................ 318/687 |
| 4,692,673 | A | * | 9/1987 | DeLong ...................... 318/132 |
| 5,091,665 | A | | 2/1992 | Kelly ........................ 310/12 |
| 5,532,533 | A | | 7/1996 | Mizutani .................. 310/68 B |
| 5,703,417 | A | | 12/1997 | Kelly ........................ 310/12 |
| 5,912,541 | A | | 6/1999 | Bigler et al. ............... 318/600 |
| 5,939,807 | A | | 8/1999 | Patyk et al. .................. 310/89 |
| 6,316,848 | B1 | * | 11/2001 | Rohner et al. ................ 310/12 |

OTHER PUBLICATIONS

Copley Controls Corp., TT *Micro* Precision Module, Document No. DR0 0031, Issue D Sep. 09, 2002, 1 page, England.
Copley Controls Corp., TT *Micro* Installation Dimensions, Document No. DR00029, Issue D Sep. 09, 2002, 1 page, England.
Copley Controls Corp., ThrustTube Motors; ThrustBlock Range, 2002, 2 pages, Canton, MA.
Copley Controls Corp., ThrustTube Motor; ThrustTube Micro Range, 2 pages, Canton, MA.
Copley Controls Corp., ThrustTube Modules; ThrustBlock Range, 2002, 2 pages, Canton, MA.
Copley Controls Corp., ThrustTube Modules; Bellows Range, 2002, 2 pages, Canton, MA.
Copley Controls Corp., ThrustTube Modules; Environmental Range, 2002, 2 pages, Canton, MA.

(Continued)

*Primary Examiner*—Karl Tamai
*Assistant Examiner*—Judson H. Jones
(74) *Attorney, Agent, or Firm*—Reinhart Boerner Van Deuren P.C.

(57) ABSTRACT

A motor is disclosed that uses magnetic propulsion for generating movement along a travel path in which the motor controller is mounted onboard the thrust block, thereby reducing connections the need for a remote motor controller. The motor includes a thrust rod extending along a travel path. The thrust rod includes an array of magnets arranged along the travel path arranged to create magnetic fields spaced along the travel path for generating magnetic propulsion when electrical coils on the thrust block are energized. The thrust block comprising a mounting body, electrical coils, and the onboard motor controller. The block may integrally provide a bearing surface that slides along a rail that may also provide the mounting structure and main support for the motor. A encoder mounted to the thrust block with a scale mounted directly to guide rail is also provided.

29 Claims, 9 Drawing Sheets

OTHER PUBLICATIONS

Pacific Bearing Products, Dolphin Guides, Inch Series Lead Screw Drive Package, Jul. 14, 2003, 3 pages, http://www.pacific-bearing.com/products/viewFamily.cfm?famID=01744213-C09F-1129-FC9A-4CCD.

Pacific Bearing Products, Dolphin Guides, Inch Series Standard Rail/Carriage Assemblies, Jul. 14, 2003, 2 pages, http://www.pacific-bearing.com/products/viewFamily.cfm?famID=01744186-C09F-1129-FC7D-231203.

Pacific Bearing Products, Dolphin Guides, Inch Series Lead Screw Drive n Guides, Jul. 14, 2003, 2 pages, http://www.pacific-bearing.com/products/viewFamily.cfm?famID=017441D4-C09F-1129-FC27-2E4B7.

* cited by examiner

MAGNETIC THRUST MOTOR

FIELD OF THE INVENTION

This invention pertains to motors, and more specifically to magnetically driven thrust motors often incorporated as linear motor into a linear motion system.

BACKGROUND OF THE INVENTION

Linear motion systems for industrial machinery and tooling often employ ball or acme screws driven by a servo motor to facilitate linear motion. The typical arrangement in these systems is that a stationary rotary motor drives a threaded screw that impart rectilinear motion upon a movable carriage that has a threaded nut engaging the screw. The movable carriage is then typically guided by a linear motion system such as one of those systems commercially available from the present assignee, Pacific Bearing Company®, located in Rockford, Ill.

However, there is another type of linear motor which uses magnetic propulsion that is sometimes referred to as a thrust tube motor or a thrust tube module (both of which are referred to herein generically as "motor"). Such thrust tube motors are set forth in literature entitled "ThrustTube Motors" and "ThrustTube Modules" and are sold under different products models commercially available from Copley Controls Corp., located in Canton, Mass. As is generally disclosed thereby, prior thrust tube motors include a thrust tube and a thrust block that linearly reciprocates relative to the thrust tube. The thrust tube typically includes a linear array of permanent magnets (e.g. many linearly stacked magnets providing multiple north and south poles) surrounded by electrical coils mounted centrally in a thrust block, that when energized drives the thrust block carriage relative to the thrust tube. To control the energizing of the electrical coils, a motor controller is typically provided at a stationary remote position from the thrust block carriage. The motor controller is connected via wiring through a flexible conduit that allows for movement of the thrust-block carriage. As also disclosed thereby, these systems are often associated with separate linear bearing motion systems.

Heretofore, there have been too many deficiencies with thrust tube motors to allow them to effectively compete or provide a commercially practical alternative to screw type servo motors. These prior systems are often too complex, require too many components, have undesirable mounting requirements and are too expensive to effectively compete in the marketplace for many machine applications, despite several technological advantages that thrust tube motors or modules provide over screw type servo motors.

BRIEF SUMMARY OF THE INVENTION

One aspect of the present invention is directed toward a motor that uses magnetic propulsion for generating movement along a travel path in which the motor controller is mounted onboard the thrust block, thereby reducing connections the need for a remote motor controller. The motor includes a thrust rod extending along a travel path. The thrust rod includes an array of magnets arranged along the travel path arranged to create magnetic fields for generating magnetic propulsion. The motor also includes a thrust block comprising a mounting body, electrical coils, and the onboard motor controller. The mounting body of the thrust block is arranged adjacent the thrust rod with the electrical coils and the motor controller being mounted thereto. The electrical coils are in electrical communication with the thrust rod, such that energizing the electrical coils facilitates relative movement between the thrust block and the thrust rod along the travel path.

Another aspect of the present invention is directed toward a unitary thrust block mounting body for a linear motor that integrally defines a bearing load surface and a central bore for receiving electrical coils for generating magnetic propulsion. The thrust block also may define a mounting cavity for mounting the motor controller.

Another aspect of the present invention is directed toward a linear motor that uses magnetic propulsion for generating movement along a travel path, in which the bearing rail provides the support structure that can be used for mounting the linear motor directly to external machines without additional mounting plates if desired. The motor includes a pair of end supports mounted directly to ends of the rail. The thrust rod which is in magnetic communication with the motor carriage is mounted to the end supports in spaced parallel relation to the rail. In this manner, the rail supports the end supports, the thrust rod and the motor carriage in a cantilever manner.

Further aspects of the present invention are directed toward a servo linear motor that uses magnetic propulsion for generating movement along a travel path that includes an encoder scale directly mounted to the surface of the rail. It is an advantage that this can increase accuracy and also eliminate the need for separate plates or other structure used for mounting the scale. Also, electrical energy may be transmitted to the motor carriage if desired through the rail (e.g. through an electrical contact line along the rail or through the material of rail or a portion thereof), thereby allowing the linear motor to be wireless if desired.

Other aspects, objectives and advantages of the invention will become more apparent from the following detailed description when taken in conjunction with the accompanying drawings.

DETAILED DESCRIPTION OF THE INVENTION

Figure 1:
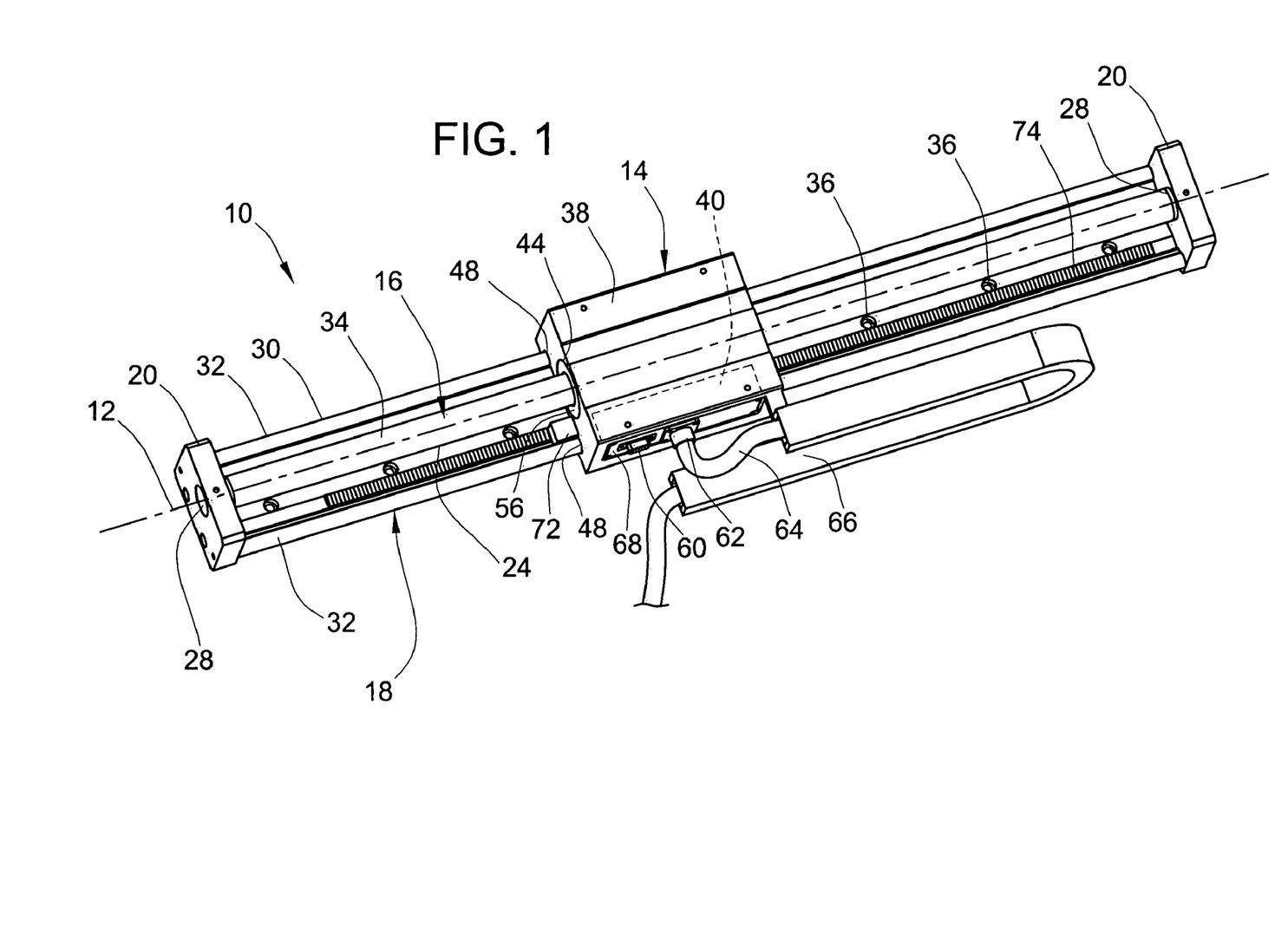
FIG. 1 is an isometric view of a linear servo motor in accordance with a preferred embodiment of the present invention.
Figure 2:
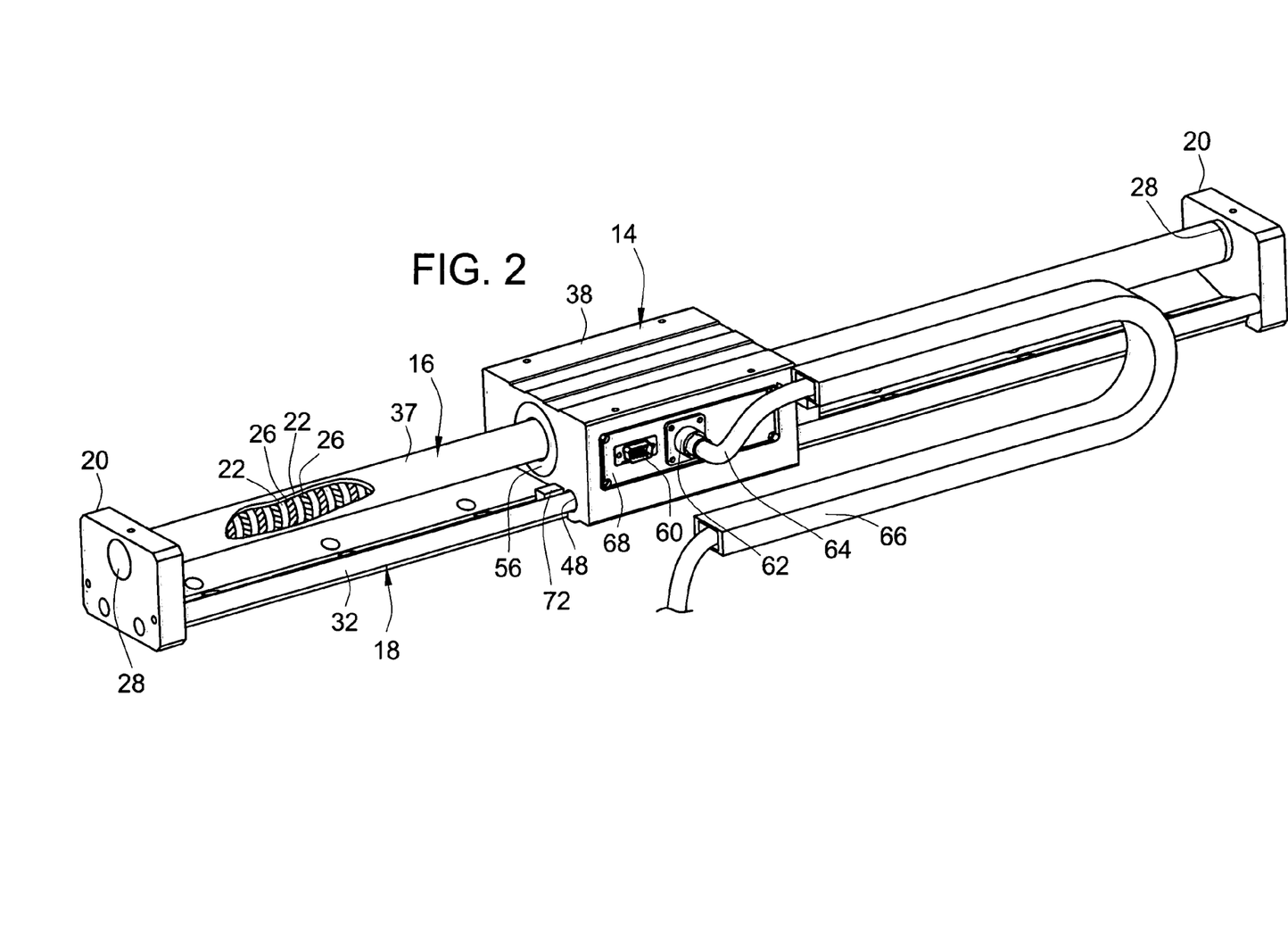
FIG. 2 is an isometric view of the linear servo motor show in FIG. 1 at a different angle.
Figure 5:
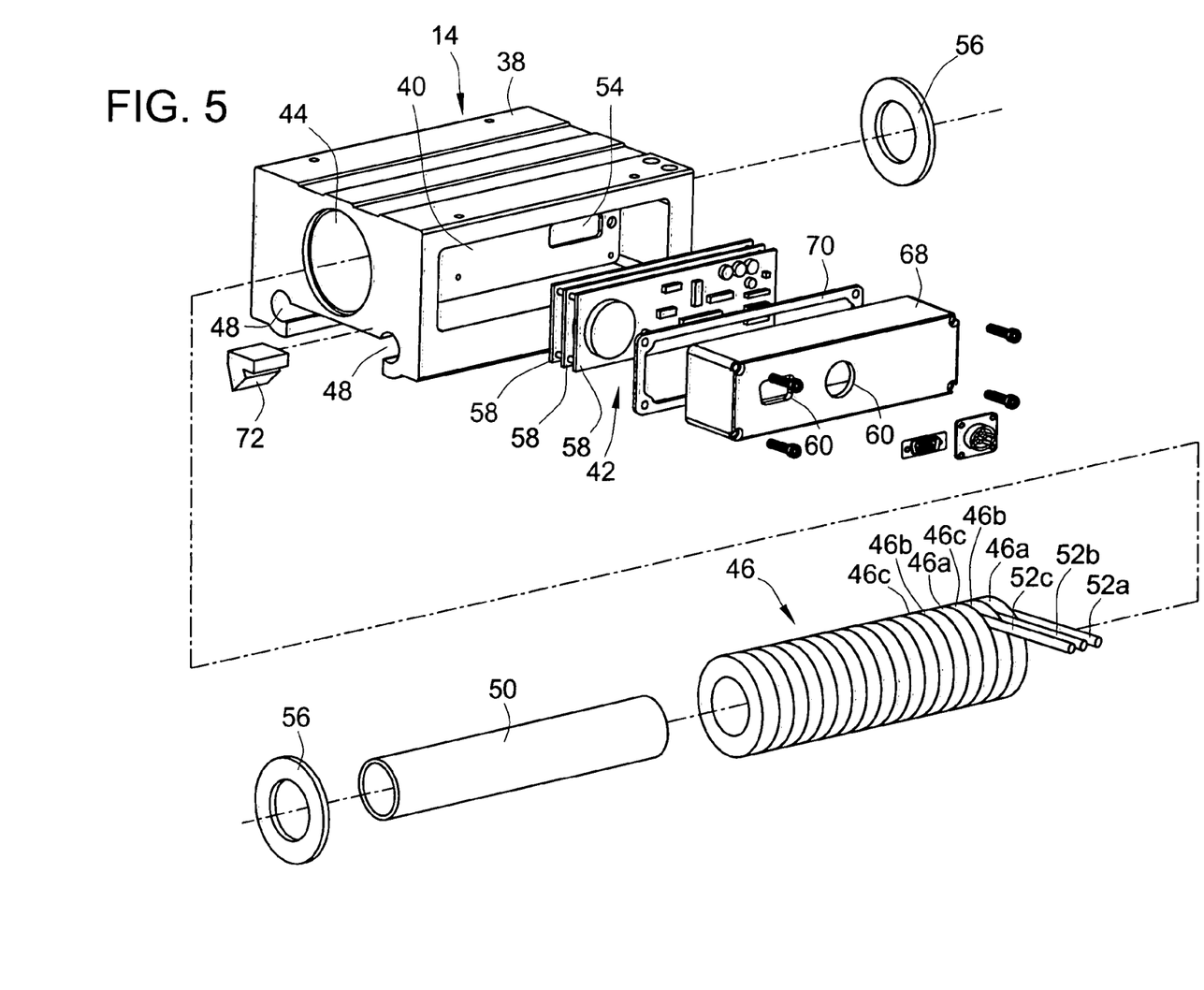
FIG. 5 is an exploded isometric assembly view of the linear servo motor shown in FIG. 1.

An embodiment of the present invention is illustrated in FIGS. 1, 2, and 5 as a servo motor 10 that uses magnetic propulsion for facilitating movement along a travel path 12. The servo motor 10 is shown as the linear type with movement along a linear travel path although other travel path shapes are possible. As shown, the motor 10 may be provided as a complete linear motion package to include a thrust block or carriage 14, a thrust rod 16, a bearing rail 18, and a pair of end supports 20.

As illustrated in FIG. 5, the thrust rod 16 includes a plurality of permanent magnets 22 that are arranged in a linear array in a hollow support tube 24, which may be comprised of steel material. The permanent magnets 22 are contained in the bore of the hollow support tube and are aligned linearly along the linear travel path 10 in a linear succession, with the poles of adjacent magnets 22 being reversed (e.g. N-S, S-N, N-S, S-N, etc.), although other magnet arrangements including a single orientation (e.g. N-S, N-S, N-S, etc.) may be possible. The magnets 22 are arranged to provide several alternating magnetic fields along the travel path 12. These magnetic fields are used to generate magnetic propulsion along the travel path 12. Adjacent permanent magnets 22 may be in abutting end to end relation or may be separated by iron spacer elements 26 as shown. The magnets 22 and spacer elements 26 are contained and secured in a stationary fixed position in the support tube 24 and enclosed via steel end caps 28 mounted to opposed ends of the tube 24. As shown herein, the support tube 24 and the magnets 22 may be cylindrical in shape. However, it will be appreciated that other shapes may be used such a rectangular or flat shape, in which flat magnets may be used, or other suitable shape. Thus, the magnets may be tubular magnets, flat magnets, iron core, ironless, or other appropriate type of magnet for creating alternating magnetic fields along the travel path 12.

Figure 6:
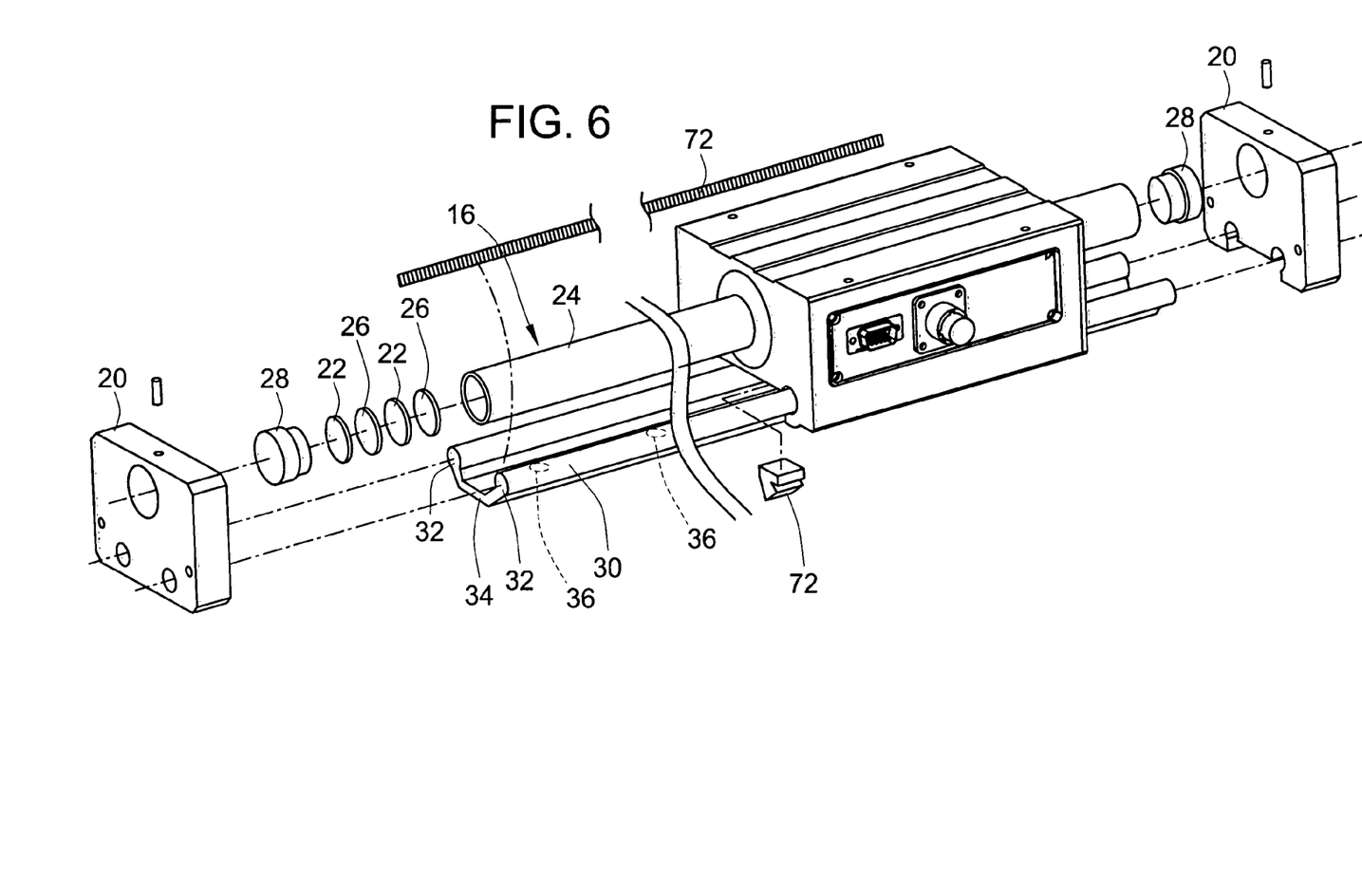
FIG. 6 is an isometric exploded assembly view of rail and thrust rod assembly.

Preferably, the rail 18 is structurally a one piece unitary member as shown and may be made of steel, aluminum or other suitable structural support material for providing bearing load support. The end supports 20 which are at the ends of the travel path 12 are mounted to and secured to opposed ends of the rail 18, such a via screws as shown. The end supports 20 in turn support the assembled thrust rod 16 in spaced parallel relation to the rail 18. Set screws through the top of the end supports 20 secure the thrust rod 16 in place. In this manner, the rail 18 supports the end supports 20 and the thrust rod 16 in a cantilever manner. The rail defines mounting holes 36 for receiving threaded fasteners, integral bracket mounts or other mechanical mounting structure and thereby provides means for mounting the linear servo motor 10. Once the rail 18 is mounted, the rail 18 can provide cantilever support for the entire linear servo motor 10 without other intermediate structure needed. Thus, the rail 18 can be directly mounted to a machine without any intermediate mounting plates which is particularly advantageous applications where only a small envelope is available, although mounting plates can also be used when desired.

The rail 18 defines a bearing load surface 30, which may be provided by a pair of laterally spaced parallel cylindrical tracks 32 as shown. As shown, the tracks 32 may be unitarily formed with each other and connected by an intermediate unitary mounting portion 34 unitarily formed therewith, which may provide the mounting holes 36. The bearing load surface 30 may be lubricated and/or coated with a low friction material that facilitates smooth sliding movement using self lubricating bearing technology (both sliding components are typically lubricated and/or coated), typically without metal to metal contact. Suitable profile guide rails having such a low friction coating are commercially available from the present Assignee, Pacific Bearing® under the mark Dolphin Guides®. Although one form of a bearing contact surface is shown, it will be appreciated by one of ordinary skill in the art that other types of bearing interface surfaces may be used for facilitating sliding movement, including but not limited to, air bearing, ball, needle, plane or other appropriate bearing surfaces.

Figure 3:
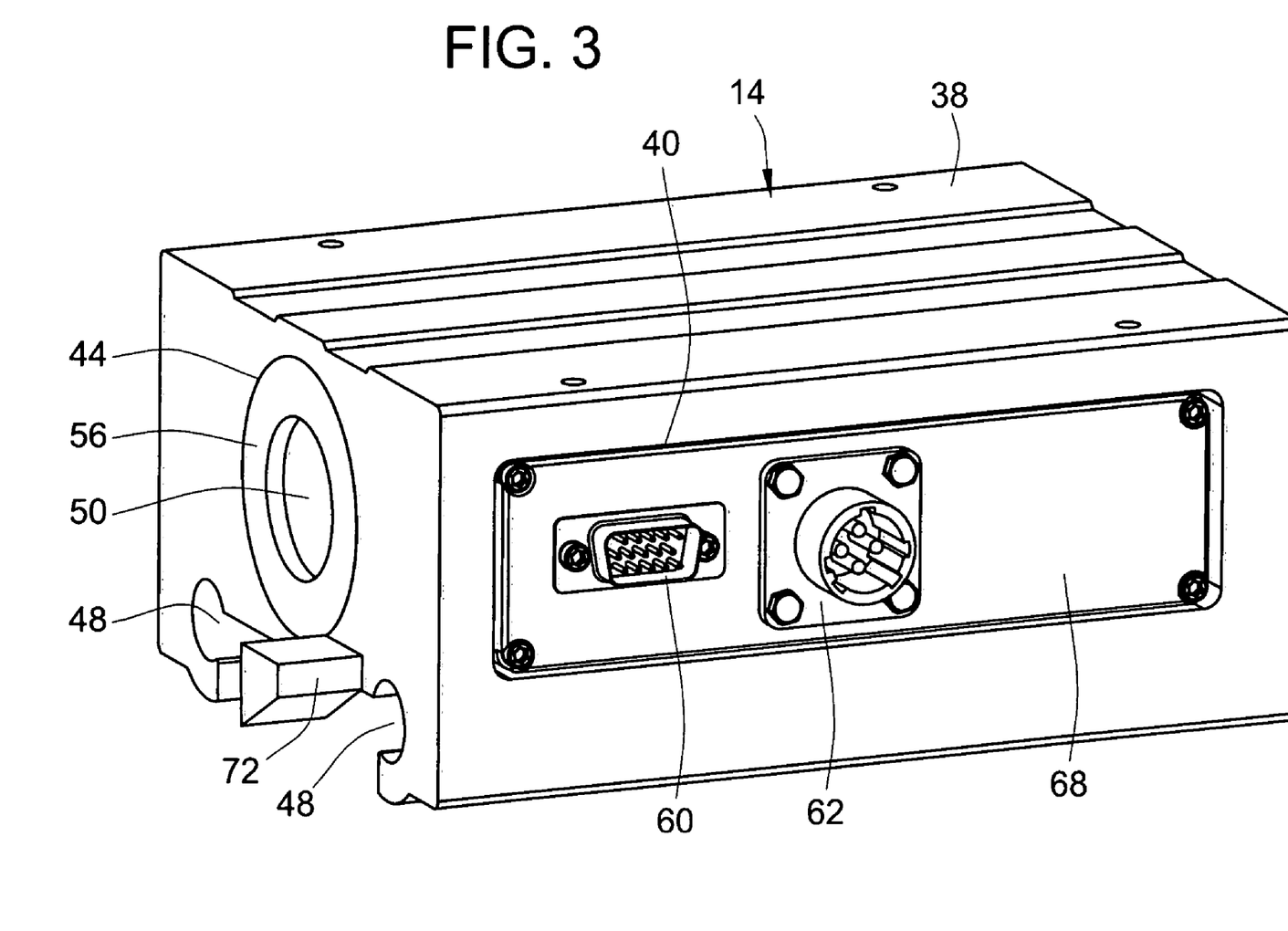
FIG. 3 is an isometric view of the thrust block for the linear servo motor shown in FIG. 1.
Figure 4:
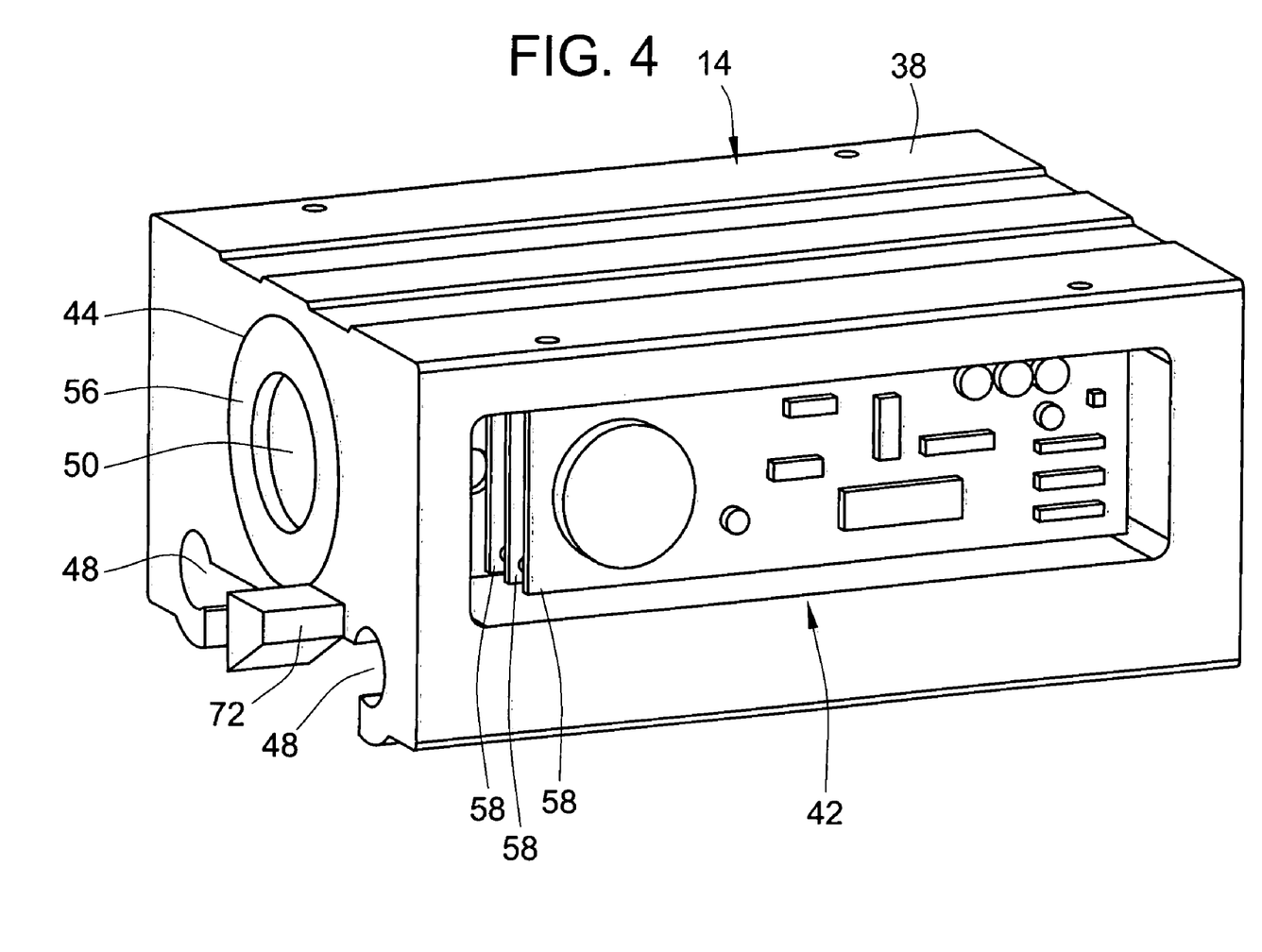
FIG. 4 is a view similar to FIG. 3, but with the cover plate for the thrust block removed to show the motor controller boards are mounted.

The thrust block or carriage 14 comprises a mounting body 38 that provides a base support structure for the carriage 14. As shown, and in accordance with an aspect of the present invention, the mounting body 38 is preferably a one piece unitary member that may be formed from aluminum, steel or other suitable support material. The mounting body 38 provides structural support that supports various components of the carriage 14. The unitary member of the mounting body 38 integrally defines a mounting cavity 40 for mounting an onboard motor controller 42, a central bore 42 for mounting of electrical coils 46, and a bearing load surface that corresponds to the shape of the surface of the rail 18, and in the disclosed embodiment is in the shape of cylindrical guide channels 48.

The guide channels 48 defined by the mounting body 38 may be lubricated and/or coated with a low friction material similar to the rails to facilitate smooth sliding movement using self lubricating bearing technology. In accordance with one aspect of the present invention, the guide channels 48 are preferably unitarily formed into the same support block that supports the electrical coils 46 in place. The guide channels 48 may be machined or otherwise formed into the bottom side of the mounting body 38 as shown. With a unitary one piece construction, there is no need to separately mount bearing guides onto the carriage as the sliding bearing load surface is integrally provided, thereby reducing complexity, and avoiding accumulation of manufacturing tolerances that typically occurs when different individual member components are fastened together. However, for higher load applications, other bearing surfaces such as may be provided by ball or needle bearings can be used and mounted to the carriage.

The central bore 44 of the mounting body 38 receives the electrical coils 46. As shown in the drawings, there are typically multiple sets 46a, 46b, 46c of electrical coils 46. Each set 46a comprises one or more electrical coils, and as disclosed in the drawings six electrical coils 46. The number of electrical coils is not critical as long as the are operatively arranged to create a driving force when energized to facilitate linear movement. As shown in FIG. 5, the coils 46 of the multiple sets are interleaved together in a linear succession. Each individual coil 46 has a length operationally related to or corresponding to the length of the individual magnets 22 or magnetic fields thereof, such that alternating successive energizing of the different sets 46a–46c of electrical coils 46 creates a force that facilitates substantially continuous relative linear translation between the thrust rod 16 and the thrust block or carriage 14 along the entire length of the travel path 12. Also, the carriage 14 can be held in a stationary or temporary fixed position after a movement by continuing to energize one of the sets of the coils 46a–46c.

To mount the electrical coils 46, the coils are installed into the bore 44 of the mounting body 38. The outer diameter of the coils 46 closely corresponds to the inner diameter of the bore 44. A cylindrical plastic retaining tube 50 is also installed on the inside diameter of the electrical coils 46.

Terminating end wires 52a, 52b, 52c, typically on the outer diameter of the end coil members of the individual wire coil sets 46a, 46b, 46c, are routed through an internal passageway 54 defined in the mounting body 38 connecting the bore 44 with the controller cavity 40. The ends wires 52a, 52b, 52c are soldered or otherwise electrically coupled the coils 46 to the motor controller 42. With the coils 46 installed in the bore 46, epoxy material, preferably of low viscosity, or other suitable material can be injected or otherwise introduced into the bore 44 and around the coils 46, such as through various strategically located injection holes in the mounting body 38 with epoxy retention being facilitated by the plastic tube 50 and plastic end washers 56. Once the epoxy cures, it securely mounts the coils 46 and seals the coils 46 inside the mounting body 38.

In accordance with an aspect of the present invention, the servo motor 10 includes an onboard motor controller 42 that is part of the carriage 14 and mounted to the mounting body 38. The motor controller 42 comprises one or more circuit boards that comprises a microprocessor, programmable logic controller or other suitable controller that controls and selectively energizes the different sets 46a–c of electrical coils 46 to selectively drive the carriage 16 in either direction, to selectively hold the carriage 14 in a stationary position or to de-energize the coils to allow free motion of the carriage 14. The motor controller 42 may also include one or more amplifiers, transformers, memory chips and position sensing circuits. These different controller components are operationally arranged on circuit boards 58 which are mounted into the defined cavity 40 in the carriage mounting body 38.

To provide for program input, data input and the like, a control interface port 60 is provided on the carriage 16. The control interface port 60 comprises a free electrical connector that is in electrical communication with the motor controller 42. A technician can program and set up the operational parameters of the servomotor 10 utilizing the control interface port 60 by connecting the port 60 to a user interface such as a laptop computer. Once the motor controller 42 is programmed to perform one or more desired functions (e.g. a sequential operational program), these functions can be performed without any external control connections. If desired, user interface inputs may also be provided on the carriage 16 to provide for user selection of different alternate programs to be run, to provide for initialization (e.g. a return to a home position) or for further programming of the controller 42. It is a significant advantage of this aspect that no control wires need to be run to the carriage 16 and that no separate motor controller module needs to be mounted at a remote location on a machine of an application of the servo motor, thereby freeing up available space in applications and simplifying implementation of the motor into applications. Instead, the onboard motor controller 42 is carried by and moves along with the carriage 16 in the disclosed embodiment.

The carriage 16 also comprises a power supply port 62 to receive the supply of electrical energy needed to operate the controller 42 and energize the coils 46. The power supply port 62 is in electrical communication with the motor controller 42. To provide for electrical power transmission, an electrical supply line 64 is used that is continuously connected to the power supply port 62 when the servo motor 10 is incorporated into a desired application. To avoid tangling or interference with the electrical supply line 64, a flexible movable wire conduit 66 is provided that has one end mounted the thrust block carriage 16 for carrying the power supply line 64 to the power supply port 62. The other end may be mounted to a fixed stationary point on the machine of the intended application.

The motor controller 42 may be enclosed in the cavity 40 with a cover 68. The cover 68 is fastened to the mounting body 38. The cover 68 includes holes for communicating the electrical port 60, 62. Preferably, a gasket 70 is provided along with the cover 68 to seal off the cavity 40 and thereby protect the motor controller 42 from external contaminants and liquids. Because the motor controller 42 is not mounted in a remote location, but instead is mounted on-board the carriage 14, a location which is typically subject to greater potential for contaminants or fluids in many applications, the gasket 70 protects the motor controller 42, preventing short circuits and the like, and thereby ensures operational integrity.

Additionally, the motor 10 may include a position feedback mechanism which includes position sensor shown as an optical encoder 72 that communicates with a linear encoder scale 74 (other position sensors such as limit switches and the like could alternatively be used, depending upon the needs of the application). The optical encoder 72 is fastened or otherwise mounted to the mounting body 38 and thereby is fixed relative to the position of the electrical coils 46. The encoder 72 is electrically coupled to the motor controller 42 and provides position feedback to the motor controller 42 which can be used to determine or ensure the motor is following a predetermined sequence or other such desired programming or functions. The scale 74 extends parallel to the travel path 12 and is affixed directly to the carriage facing surface 76 of the rail 28 between tracks 32 in spaced relation to the encoder 72. An advantage of this configuration is that no modification of the rail or separate scale plate needs to be provided, thereby avoiding tolerance build ups and reducing the number of parts/portions.

Figure 7:
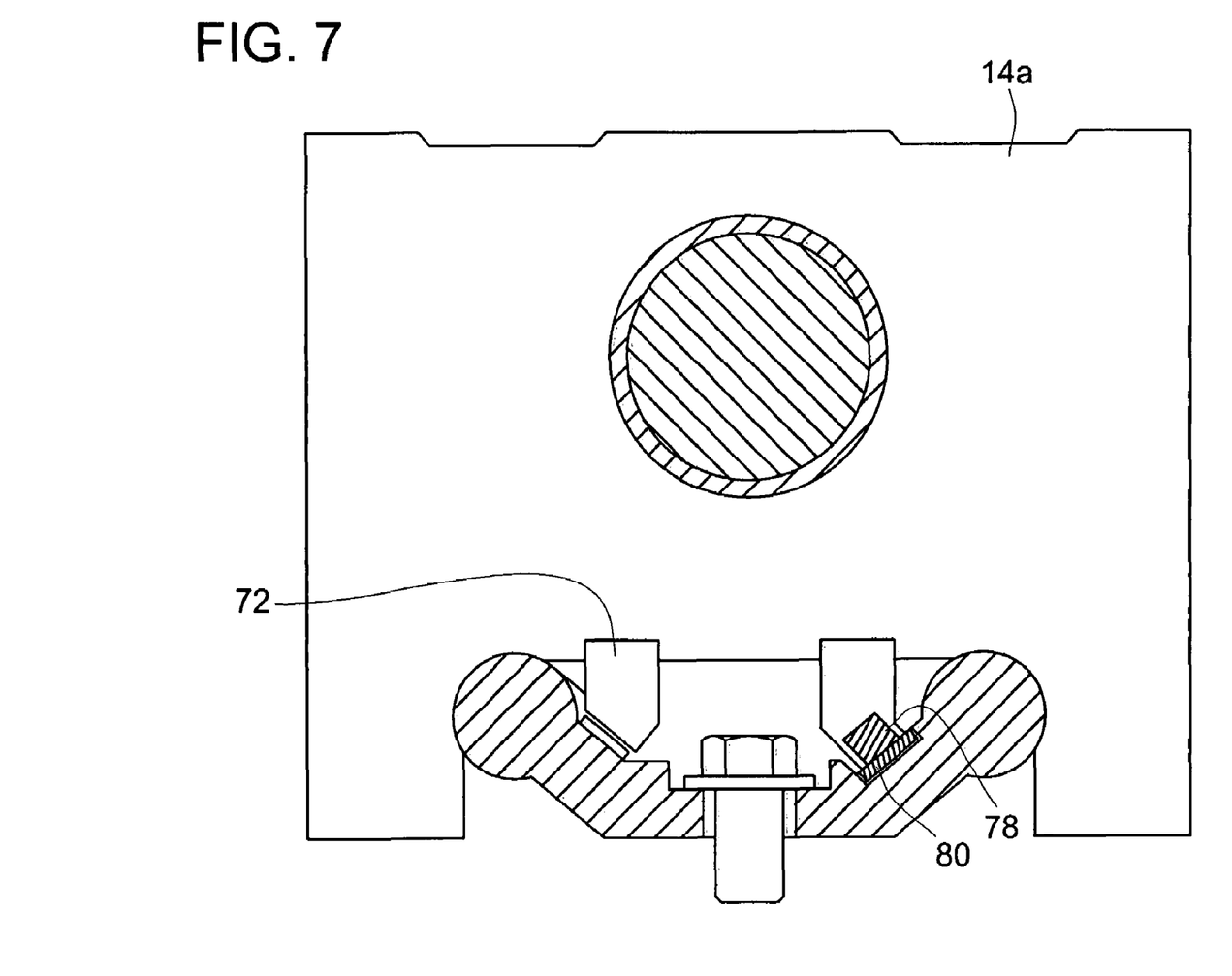
FIG. 7 is a cross sectional illustration depicting an alternative wireless embodiment of the linear servo motor.

FIG. 7 illustrates a further possibility of the present invention, namely wireless operation. This embodiment is similar to the first embodiment except that the wire conduit 66 and electrical power supply line 64 connection through the conduit 66 to the motor controller have been removed. Therefore, like numbers are used. Instead of a electrical supply line and wire conduit to the carriage, to provide electrical power, this embodiment includes a wireless carriage 14a that includes a wiper 78 that contacts an electrical power supply rail 80 that is mounted to the slide bearing rail assembly so that the motor controller 42 receives electrical power. The electrical power rail 80 may be in the form of a insulated wire inlay in the profile rail 28 extending between the end supports 20 and with the rail 80 being electrically insulated relative to the end supports. The wiper 78 maintains electrical contact with the electrical power supply rail 80 over the complete travel of the carriage 14a. Thus, the rail 18 which may be mounted in a fixed stationary position can be connected to an electrical power source to energize the electrical supply rail 80, rather than running wires to the movable carriage 14a.

Figure 8:
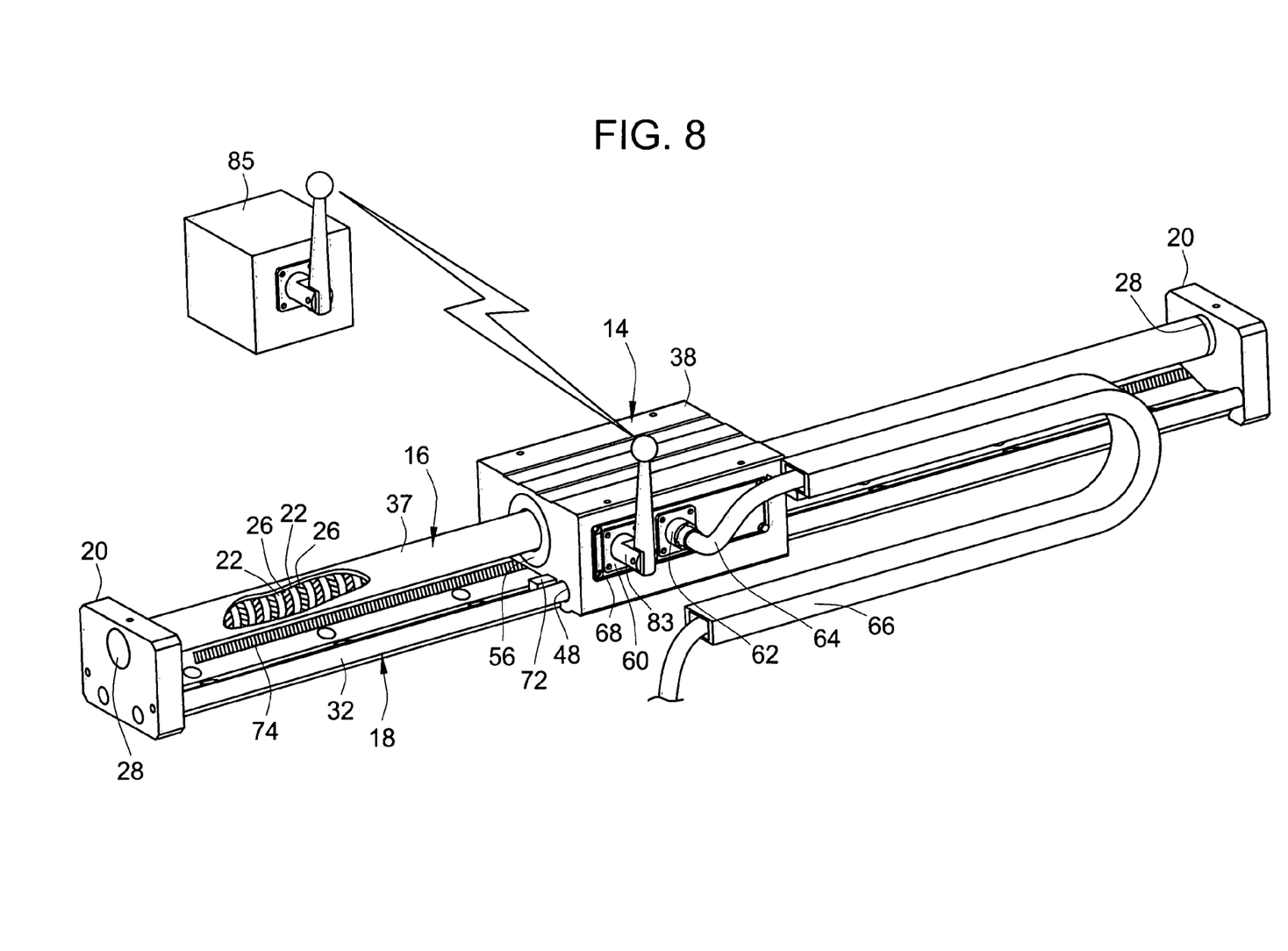
FIG. 8 is a perspective illustration of a linear servo motor having a wireless receiver and transmitter according to a further alternative embodiment of the present invention.

FIG. 8 depicts a further alternative embodiment of the present invention which provides for wireless communication of control signals when a programmed sequence is not by itself sufficient. This embodiment is similar to the first embodiment and therefore, like numbers are used. In this embodiment, however, a small wireless receiver 83 (or trans-receiver if external communication of feedback is desired) is mounted to the electrical communications port 60 to provide for wireless communication with a wireless remotely located transmitter 85 (or trans-receiver if feedback is desired). Control signals may be sent from the transmitter 85 to the receiver 83, which are received by the motor controller 42, which energizes the electrical coils 46 until a desired position of the thrust block or carriage 14 is achieved as indicated by the position feedback mechanism 72, 74. A wireless thrust block may be achieved using this feature in combination with the features discussed for the embodiment of FIG. 7. Instead of wireless transmission, it is also possible to run a control line along with the supply line 64, if external control is desired. In any event, this feature allows for manual override input or for automatic input as a result of electrical communication with other equipment in an overall system to provide for sequencing or timing of operations between various different equipment.

Figure 9:
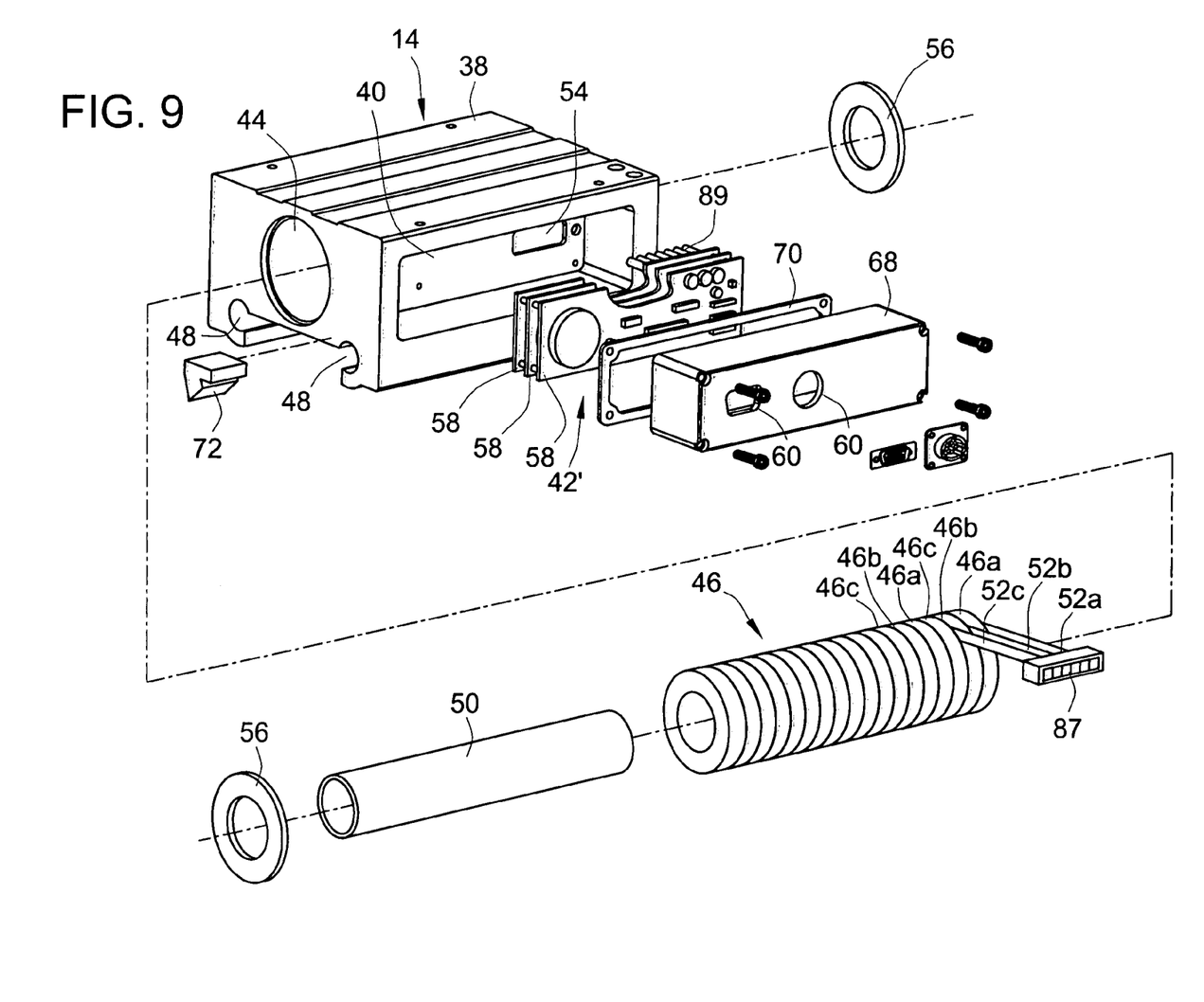
FIG. 9 is a perspective illustration of a linear servo motor having a motor controller that removably plugs into the thrust block in accordance with a further embodiment of the present invention.

A further feature is illustrated in the embodiment of FIG. 9, wherein the motor controller 42 is removably mounted to the thrust block or carriage 14, by virtue of a plug in connection. The plug in connection includes a female or male electrical connector 87 secured to the wire leads 52a, 52b, 52c that interfaces and plugs into a corresponding female or male electrical connector 89 on the back side of the motor controller 42'. The electrical connector 87 that is secured to the wire leads may be epoxied or otherwise secured in place and therefore permanent. However, the motor controller 42' can be removed and replaced if desired. Thus, in this embodiment the motor controller 42' is a replaceable component that can allow for modernizing the linear motor with a new motor controller or replacing a motor controller that has been fouled or is no longer operational.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A motor, comprising:
   a thrust rod extending along a travel path, the thrust rod including an array of magnets arranged along the travel path; and
   a thrust block comprising a mounting body, electrical coils, and a motor controller, the mounting body comprises a unitary block integrally defining a bearing load surface, further comprising a rail extending along the travel path slidably engaging the bearing load surface, the mounting body arranged adjacent the thrust rod, the motor controller being mounted onboard the mounting body, the electrical coils being mounted to the mounting body in electrical communication with the thrust rod, and wherein energizing the electrical coils facilitates relative movement between the thrust block and the thrust rod along the travel path.

2. The motor of claim 1, wherein the motor controller comprises a microprocessor.

3. The motor of claim 2, wherein the thrust block further comprises a control interface port in electrical communication with the motor controller and a power supply port in electrical communication with the motor controller, further comprising a flexible movable conduit having an end mounted the thrust block carrying power supply line to the power supply port.

4. The motor of claim 3, wherein the motor controller further includes an amplifier, a transformer, memory and position sensing electronics.

5. The motor of claim 1, wherein the unitary block also integrally defines a controller mounting cavity receiving the motor controller.

6. The motor of claim 5, further comprising a cover mounted to the unitary block member enclosing the controller mounting cavity.

7. The motor of claim 6, further comprising a seal between the cover and the unitary block member sealing the motor controller in the controller mounting cavity.

8. The motor of claim 1, further comprising an encoder system comprising an encoder scale affixed directly to the rail and an encoder scanner mounted to the unitary block.

9. The motor of claim 1, wherein the motor controller is removably mounted onboard the mounting body.

10. A linear motor, comprising:
    a thrust rod extending along a linear travel path, the thrust rod including an array of permanent magnets and a generally cylindrical tube, the permanent magnets arranged successively along the travel path in the tube;
    a guide rail extending along the travel path;
    a pair of end supports at opposed ends of the travel path supporting the thrust rod in spaced relation to the guide rail;
    a carriage comprising a mounting body, electrical coils, and a motor controller, the mounting body arranged adjacent and surrounding the thrust rod for linear movement relative to the thrust rod, the motor controller being mounted onboard the mounting body such that the motor controller is carried by the carriage, the electrical coils being mounted to the mounting body and coaxially surrounding the thrust rod in electrical communication with the permanent magnets of the thrust rod, wherein energizing the electrical coils is adapted to drive the carriage relative to the thrust rod along the travel path, the movable carriage including a bearing load surface sliding along the guide rail.

11. The linear motor of claim 10, wherein the motor controller comprises a microprocessor.

12. The linear motor of claim 11, wherein the carriage further comprises a control interface port in electrical communication with the motor controller and a power supply port in electrical communication with the motor controller, further comprising a flexible movable conduit having an end mounted to the carriage carrying power supply line to the power supply port.

13. The linear motor of claim 12, wherein the motor controller further includes an amplifier, a transformer, memory and position sensing electronics.

14. The linear motor of claim 10, wherein the mounting body comprises a unitary block integrally defining the bearing load surface.

15. The linear motor of claim 14, wherein the bearing load surface includes two parallel channels integrally formed into the unitary block, and wherein the guide rail comprises a unitary rail body integrally defining a pair of tracks sliding in the channels.

16. The linear motor of claim 15, wherein the unitary rail body directly supports the end supports and the thrust rod in a cantilever manner and defines means for mounting the linear motor.

17. The linear motor of claim 14, wherein the unitary block also integrally defines a controller mounting cavity receiving the motor controller.

18. The linear motor of claim 17, further comprising a cover mounted to the unitary block member enclosing the controller mounting cavity.

19. The linear motor of claim 18, wherein the cover provides a control interface port in electrical communication with the motor controller and a power supply port in electrical communication with the motor controller.

20. The motor of claim 19, further comprising a seal between the cover and the unitary block member sealing the motor controller in the controller mounting cavity.

21. The motor of claim 15, further comprising an encoder system comprising an encoder scale affixed directly to the rail and an encoder scanner mounted to the unitary block.

22. The motor of claim 10, wherein the carriage is wirelessly powered, electrical power being communicated through the rail to the carriage.

23. The motor controller of claim 9, wherein a plug in connection provides for removable mounting of the motor controller.

24. The motor of claim 10, further comprising a control signal input for the motor controller.

25. The motor of claim 24, further comprising a wireless receiver in communication with the control signal input for the motor controller, the wireless receiver integral with the carriage for movement therewith, and a wireless transmitter remote of the thrust block in communication with the receiver.

26. The motor of claim 10, wherein the motor controller is removably mounted onboard the carriage.

27. The motor controller of claim 26, wherein a plug in connection provides for removable mounting of the motor controller.

28. A motor, comprising:
 a thrust rod extending along a travel path, the thrust rod including an array of magnets arranged along the travel path; and
 a thrust block comprising a mounting body, electrical coils, and a motor controller, the mounting body arranged adjacent the thrust rod, the motor controller being mounted onboard the mounting body, the electrical coils being mounted to the mounting body in electrical communication with the thrust rod, and wherein energizing the electrical coils facilitates relative movement between the thrust block and the thrust rod along the travel path; and
 a rail extending along the travel path guiding movement of the thrust block, the thrust block including a bearing surface slidably engaging the rail, and wherein the thrust block is wirelessly powered, electrical power being communicated through the rail to the thrust block.

29. A motor, comprising:
 a thrust rod extending along a travel path, the thrust rod including an array of magnets arranged along the travel path; and
 a thrust block comprising a mounting body, electrical coils, and a motor controller, the mounting body arranged adjacent the thrust rod, the motor controller being mounted onboard the mounting body, the electrical coils being mounted to the mounting body in electrical communication with the thrust rod, and wherein energizing the electrical coils facilitates relative movement between the thrust block and the thrust rod along the travel path;
 a control signal input for the motor controller; and
 a wireless receiver in communication with the control signal input for the motor controller, the wireless receiver integral with the thrust block for movement therewith, and a wireless transmitter remote of the thrust block in communication with the receiver.

\* \* \* \* \*